Dec. 7, 1948.　　　J. T. MILLER　　　2,455,599
GLASS HOLDING DEVICE
Filed June 22, 1944　　　　　　　　2 Sheets-Sheet 1
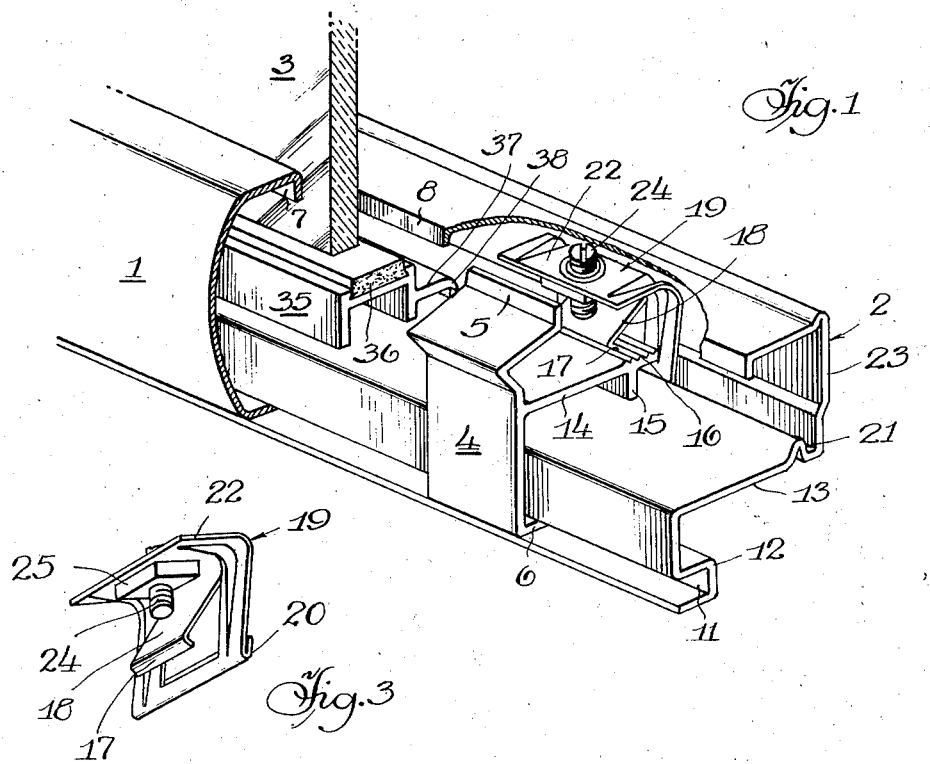
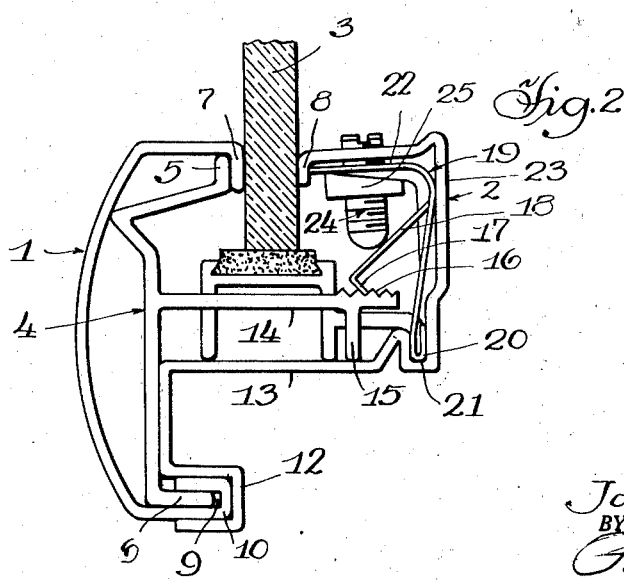
INVENTOR.
James T. Miller
BY
Parkinson & Lane
Attys Dec. 7, 1948.  J. T. MILLER  2,455,599
GLASS HOLDING DEVICE
Filed June 22, 1944  2 Sheets-Sheet 2
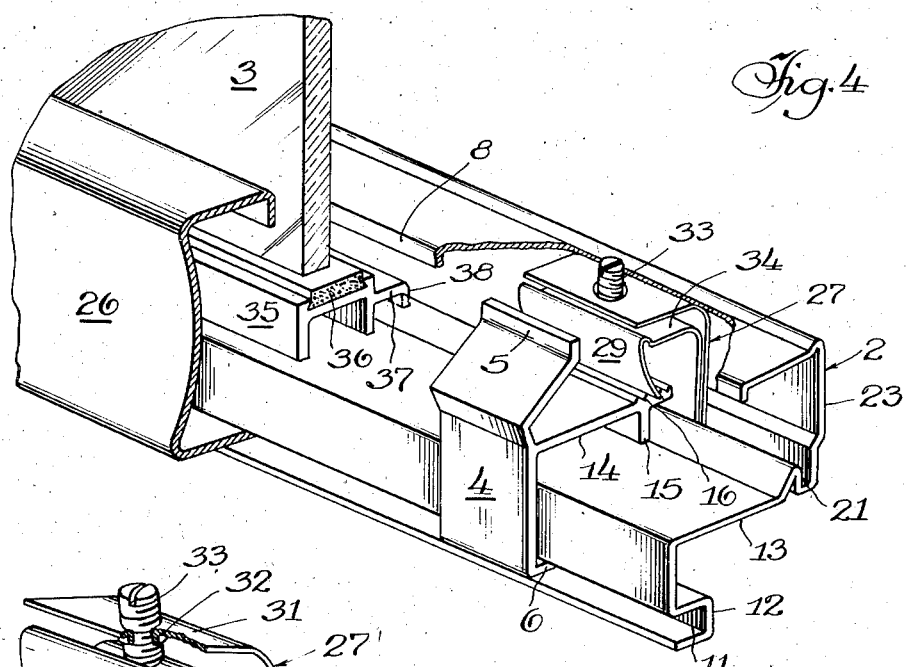
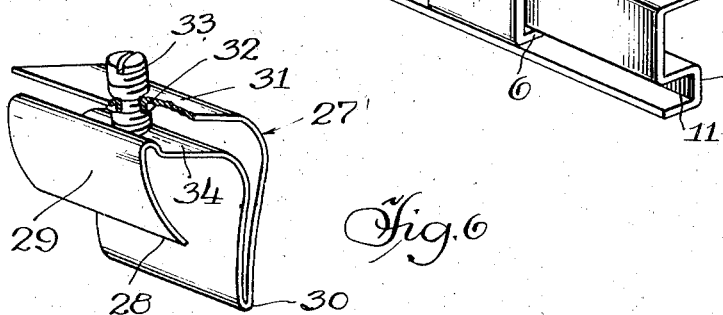
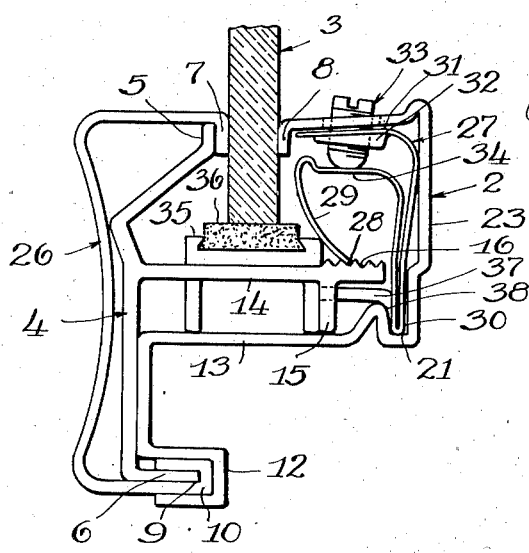
INVENTOR.
James T. Miller
BY
Parkinson & Lane
Attys.

Patented Dec. 7, 1948

2,455,599

UNITED STATES PATENT OFFICE 2,455,599

GLASS HOLDING DEVICE

James T. Miller, Niles, Mich., assignor to The Kawneer Company, Niles, Mich., a corporation of Michigan Application June 22, 1944, Serial No. 541,596

7 Claims. (Cl. 20—56.4)

The present invention relates to glass holding devices and especially to a novel setting for plate glass in a window opening, store front, etc.

Among the objects of the present invention is to provide a glass holding device or setting for a pane of glass in which the outer sash member or face moulding is detachably and resiliently anchored and retained in glass setting relation by a novel lug and clip assembly.

Another object of the present invention is to provide a novel means and manner of anchoring a face moulding in position for mounting and holding a pane of glass between it and a gutter or inner sash member with sufficient pressure to retain the glass firmly in place and irrespective of the thickness of the glass. The setting is so designed, constructed and arranged as to grip and retain the glass despite variations in its thickness and also permit easy replacement of the glass when required.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a fragmentary view in perspective of the glass holding device.

Figure 2 is a view in end elevation of the glass holding assembly.

Figure 3 is a view in perspective of the spring clip.

Figure 4 is a fragmentary view in perspective of an alternate construction of glass holding device.

Figure 5 is a view in end elevation of this alternate construction.

Figure 6 is a view in perspective of the alternate spring clip.

Referring to the illustrative embodiment shown in Figures 1, 2 and 3 of the drawings, there is disclosed a glass holding device comprising a face moulding or outer sash member 1 detachably and adjustably mounted upon a gutter or inner sash member 2 adapted to retain therebetween a pane of plate glass 3. As this glass may vary in thickness and in order to permit it to be quickly and easily replaced, the invention comprehends a novel means and mechanism associated with the sash members for adjustably and resiliently retaining the face moulding in glass holding position. Such means comprises spaced lugs 4 each having its opposite edges 5 and 6 anchored within the face moulding with the edge 5 seating against and pressing the glass engaging lip or flange 7 of the face moulding against the outer face of an edge of the glass 3 and the inner edge of the glass against the glass engaging lip or flange 8 of the gutter 2, and the inwardly or rearwardly extending edge 6 disposed within the outwardly opening channel or recess 9 of the projecting end 10 of the face moulding. This channelled or recessed end 10 is in turn conformably received within an outwardly opening groove or channel 11 provided in a projecting edge 12 of the base 13 of the gutter.

Each lug 4 is provided with a rearwardly projecting leg or ledge 14 disposed in a substantially horizontal plane and provided on the lower surface with a depending supporting rib 15 seating against the base 13 of the gutter. On its upper surface this leg or ledge is provided with a plurality of relatively closely spaced serrations 16 adapted to be engaged by the end 17 of a spring tongue 18 depending from a spring clip member 19. These spring clips 19 are spaced in alignment with the lugs 4 and each is snapped into and retained in the gutter in such spaced relation by having its lower edge 20 thereof anchored in the longitudinally extending groove 21 in the base of the gutter and its upper part 22 anchored between the rear wall 23 of the gutter and its flange or lip 8.

The depending resilient or spring tongue 18 is adapted to be depressed by an adjusting screw 24 with the lower end of the screw engaging the tapered or inclined cam surface 18 whereby to depress the end 17 thereof into one of the serrations 16, the particular serration depending upon the thickness of the pane of glass to be set. In order to adjust the screw 24 in the gutter, the spring clip 19 is provided with a clinch nut 25 for receiving the screw and the gutter is provided with an opening through which the head of the screw projects to permit such adjustment from the interior or rear of the pane of glass.

By actuating or depressing the tongue 18 upon screwing down on the adjusting screw, there is created a downward and inward thrust causing the rearwardly inclined projecting end 17 to engage a serration and thereby lock the lug and face moulding in anchored position. When the screw is released, the tongue due to its resiliency and pivoting action, will rise and release the lug to permit withdrawal and removal of the face moulding.

In Figures 4, 5 and 6 is disclosed an alternate construction showing a slightly modified form of face moulding or outer sash member 26 but a similar construction and arrangement of lugs 4 and gutter 2 to which reference characters similar to those in Figures 1, 2 and 3 have been applied. In this form of the invention, there is disclosed a modified form of spring clip 27 in which the inwardly and rearwardly projecting edge 28 of the spring tongue 29 is shown engaging a serration 16 on the upper face of the lugs.

As more clearly shown in Figures 5 and 6, this spring clip has its lower edge 30 anchored in the longitudinally extending groove 21 in the base of the gutter and its upper end or flange 31 positioned and anchored between the rear wall 23 of the gutter and its glass engaging flange or lip 8. In this upper end 31 is provided an embossed opening 32 threaded to receive an adjusting screw 33 having its head projecting through an opening provided in the gutter and its lower end adapted to bear against the upper surface of the ledge 34 of the spring clip for depressing the spring tongue 29 and forcing its edge 28 into one of the serrations to thereby lock the lug 4 and face moulding 26 in adjusted position in which it firmly yet resiliently retains the pane of glass 3 in the setting.

As disclosed more clearly in Figures 1, 2, 4 and 5 of the drawings, the pane of glass 3 is shown mounted upon spaced setting blocks 35 having a dove-tailed groove in its upper surface into which is inserted a cushion 36 for the glass to rest upon. In order to locate each setting block in its proper relation with the glass 3, it is provided with a flange 37 having a turned down leg 38 conformably seating into the groove 21 in the base of the gutter. This flange locates the setting block centrally under the glass and prevents it tipping over or sliding out of position.

Having thus disclosed my invention, I claim:

1. In a glass holding device including an inner sash member held in fixed position and an outer sash member removable and adjustable with relation to the inner sash member, and means for adjustably and detachably mounting the outer sash member in assembled relation in which it engages and retains a pane of glass, said means comprising a lug carried by the outer sash member, a spring clip anchored in the inner sash member, spaced serrations provided on the lug, a resilient depending tongue on the clip provided with a rearwardly and downwardly projecting end and an adjusting screw adapted to bear on the tongue and to depress the end of the tongue into locking engagement with one of the serrations depending upon the thickness of the glass to be retained.

2. In a glass holding device for setting and retaining a pane of glass and including a gutter member secured in position and a face moulding removably and adjustably mounted with respect to the gutter member for retaining a pane of glass therebetween, a lug anchored in the face moulding and adjustable therewith, a locking member anchored in the gutter member and provided with a depending resilient tongue, interlocking projections on the lug, and means bearing on said tongue for forcing an edge of the resilient tongue rearwardly into engagement with one of the projections for locking the face moulding in holding contact with the glass.

3. In a glass holding device for setting and retaining a pane of glass and including a gutter member secured in position and a face moulding removably and adjustably mounted with relation thereto for retaining a pane of glass therebetween, a rigid lug carried by the face moulding and adapted to move the face moulding into glass holding position, serrations provided on an inwardly extending portion of the lug, a clip carried in the gutter member and provided with an inclined resilient portion provided with a rearwardly projecting end adapted to engage a serration, and means bearing on said portion for depressing the inclined resilient portion and forcing its end into interengagement with a serration to thereby lock the lug against retraction and the face moulding in position to hold the glass.

4. In a glass holding device for setting and retaining a pane of glass and including a gutter member secured in position and a face moulding removably and adjustably mounted with relation thereto for firmly yet yieldably mounting a pane of plate glass of any desired thickness therebetween, a member mounted in the face moulding and adapted to draw the face moulding into glass setting position when retracted, a rearwardly projecting leg on said last mentioned member having its upper surface provided with a plurality of projections, a spring clip anchored in the gutter member and provided with a resilient tongue having a rearwardly projecting part adapted to be depressed into latching engagement with a projection, and when released, disengaging from the projection and permitting withdrawal and removal of the face moulding and lug, and means contacting said tongue for depressing it into said latching engagement.

5. A sash construction for windows, store fronts and the like, comprising an inner sash member providing a gutter, an outer sash member providing a face moulding slidable into and out of holding contact with an edge of a pane of glass, a lug carried by the outer sash member having an inwardly and rearwardly extending projection, a spring clip resiliently mounted in the inner sash member, and a resilient projection on the clip adapted to be depressed and moved rearwardly into latching engagement with the projection for retaining the lug and outer sash member in glass holding position, and when released, disengaging from the projection and permitting withdrawal and removal of the outer sash member and lug for replacement of the glass, and means contacting said resilient projection for depressing it into said latching engagement.

6. A sash construction for windows, store fronts and the like, comprising an inner sash member providing a gutter, an outer sash member providing a face moulding slidable into and out of holding contact with an edge of a pane of glass and retaining the pane of glass between the sash members, and means for adjustably mounting the outer sash member in such manner as to receive and retain panes of glass of varying thicknesses, said means including a lug anchored within the outer sash member, a rearwardly and substantially horizontally extending leg on the lug, a rib depending from the leg and adapted to seat upon the base of the inner sash member, serrations formed on the upper surface of the leg adjacent the inner end thereof, a clip anchored in the inner sash member in alignment with the lug, and a resilient projection on the clip adapted to be depressed and moved rearwardly into latching engagement with a serration when the outer sash member and lug have been moved into glass holding position, and when released, permitting withdrawal and removal of the outer sash member and lug, and means bearing on said resilient projection for depressing it into said latching engagement.

7. A sash construction for windows, store fronts and the like, comprising an inner sash member providing a gutter, an outer sash member providing a face moulding slidable into and out of holding contact with an edge of a pane of glass and retaining the pane of glass between the sash members, and means for adjustable mounting the outer sash member in such manner as to receive and retain panes of glass of varying thicknesses, said means including a lug anchored within the outer sash member, a rearwardly and substantially horizontally extending leg on the lug, a rib depending from the leg and adapted to seat upon the base of the inner sash member, serrations formed on the upper surface of the leg adjacent the end thereof, a clip anchored in the inner sash member in alignment with the lug, a resilient projection on the clip adapted to be depressed and provided with a rearwardly inclined end adapted to be moved into latching engagement with a serration when the outer sash member is moved into glass setting position, and when released, permitting withdrawal and removal of the outer sash member and lug, and a screw threaded in the clip and bearing on said resilient projection and adjusted from the rear of the glass for moving the resilient projection into latching engagement and for releasing it from such engagement.

JAMES T. MILLER.

REFERENCES CITED

The following references are of record in the file of this patent:

UNITED STATES PATENTS

| Number | Name | Date |
|---|---|---|
| 1,008,984 | Murnane | Nov. 14, 1911 |
| 2,143,737 | Lowry | Jan. 10, 1939 |
| 2,166,361 | Lowry | July 18, 1939 |

Certificate of Correction

Patent No. 2,455,599.                                      December 7, 1948.

JAMES T. MILLER

It is hereby certified that error appears in the printed specification of the above numbered patent requiring correction as follows:

Column 5, line 16, claim 7, for the word "adjustable" read *adjustably*; and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*